United States Patent Office 3,705,158
Patented Dec. 5, 1972

3,705,158
BICYCLIC DEHYDROPIPERAZINE COMPOSITIONS
Alan O. Pittet, Atlantic Highlands, Ranya Muralidhara, Matawan, and Ernst T. Theimer, Rumson, N.J., assignors to International Flavors & Fragrances, Inc., New York, N.Y.
No Drawing. Filed Aug. 31, 1970, Ser. No. 68,531
Int. Cl. C07d 51/74
U.S. Cl. 260—250 R          5 Claims

ABSTRACT OF THE DISCLOSURE

Processes for altering the flavors and/or aromas of products, including foodstuffs and tobaccos, which comprise adding thereto a small but effective amount of at least one dehydropiperazine having the formula

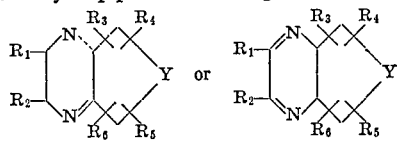

where Y is $(-CH_2-)_n$; $n$ is an integer from one to six; one dashed line represents a double bond and the other represents a single bond; and $R_1$, $R_2$, $R_3$, $R_4$, $R_5$, and $R_6$ are the same or different and represent hydrogen or alkyl; the products so produced; flavoring and fragrance compositions containing such dehydropiperazines; and novel dehydropiperazines and processes for their production.

BACKGROUND OF THE INVENTION

The present invention relates to bicyclic dehydropiperazines and their use in processes and compositions for altering the flavors and/or fragrances of various materials such as tobaccos, foodstuffs, and the like, as well as such novel dehydropiperazines and processes for producing them.

Because of the tremendous consumption of foods, tobaccos, and other materials, there has been an increasing interest in substances and methods for imparting flavors to such consumable materials. This interest has been stimulated not only because of the inadequate quantity of natural flavoring materials available, but perhaps even more importantly, because of the need for materials which can combine several nuances, will be more stable than natural materials, will blend better with other flavors or flavoring components, and will generally provide superior products.

There have recently been suggestions that certain pyrazine derivatives have flavors which might be useful in foods and other consumable materials. For example, tetramethylpyrazine has been used with vanillin in chocolate flavors, acetylpyrazine has been used in tobacco and foods, and methoxypyrazine has been said to impart a nut-like flavor to foods. Pyrazino[b]cyclopentanes have also been suggested.

THE INVENTION

It has now been found that bicyclic dehydropiperazines are capable of imparting a wide variety of flavors to various consumable materials. Briefly, the invention contemplates altering the flavors of such consumable materials by adding thereto a small but effective amount of at least one bicyclic dehydropiperazine having the formula

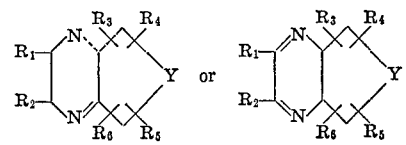

wherein Y is $(-CH_2-)_n$; $n$ is an integer from one to six, inclusive; one dashed line represents a double bond and the other represents a single bond; and $R_1$, $R_2$, $R_3$, $R_4$, $R_5$, and $R_6$ represent hydrogen or alkyl and are the same or different. The invention also contemplates flavoring and fragrance compositions containing such bicyclic dehydropiperazines, as well as the novel dehydropiperazines and the processes for preparing them.

More specifically, the bicyclic dehydropiperazines according to this invention are partially reduced pyrazines with a five- to ten-membered hydrocarbon ring fused to the "b" side of the reduced pyrazine ring. Such hydrocarbon ring can be substituted with one or more alkyl groups, and the diazine ring can also be substituted with one or two alkyl groups. In some instances one or the other of the rings can be substituted with an alkadienyl group. It will be appreciated from the present disclosure by those skilled in the art that one or more pairs of the alkyl groups substituent on the carbocyclic ring can be geminal, i.e., can be attached to the same ring carbon atom. It is generally preferred in practicing the present invention that the substituents be hydrogen or a lower alkyl group, particularly one having from one to three carbon atoms.

A particularly preferred bicyclic piperazine for use herein is 5-methyl - 3,4,6,7 - tetrahydro - 2(H) - cyclopentapyrazine having the structure

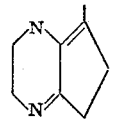

This is a crystalline solid having a melting point of 117–121° C. It has a roasted nut, burnt aroma.

Another material according to the present invention is 5-methyl - 3,5,6,7 - tetrahydro - 2(H) - cyclopentapyrazine having the structure

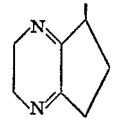

Another material exemplifying the present invention is 5,7,7 - trimethyl - 2,3,4,6,7,8 - hexahydroquinoxaline having the formula

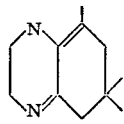

This material has a sweet, tobacco-like fragrance note. It is a pale, yellow solid. The invention is further exemplified by 2,3-dimethyl - 4a,5,6,7,8,8a - hexahydroquinoxaline having the formula

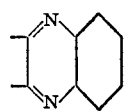

This material has an interesting tobacco-like, buttery aroma character and is a white solid which turns tan and finally blue after storage. Both cis and trans isomers are encompassed within the above formula, and the melting point of the material varies over a range depending upon the ratio of the cis-trans ring junction isomers encompassed in the foregoing formula.

A further bicyclic dehydropiperazine according to the invention is 2,3,5,6,7,8,9,10,11,12-decahydrocyclodecapyrazine having the formula

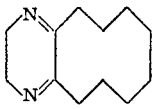

The novel bicyclic dehydropiperazines prepared according to the present invention can be obtained by a number of reaction routes, as by reacting diaminocycloalkane or monoalkyl- or polyalkyl-substituted diaminocycloalkane with glyoxal (a "dioxoalkane") or 1-alkyl or 1,2-dialkyl derivatives thereof, e.g., 2,3-butandione, under ring-closing conditions, or by reacting ethylenediamine or an alkyl or 1,2-dialkyl derivative thereof with a 1,2-cycloalkadione or a mono- or polyalkyl derivative thereof.

Examples of the 1,2 - diaminocycloalkanes are as follows:

1,2-diaminocyclohexane;
1,2-diamino-4,5-dimethylcyclohexane;
1,2-diamino-3,4,5,5-tetramethylcyclohexane;
1,2-diamino-3,4,4-triethylcyclohexane;
1,2-diamino-3,3-dimethyl-5,5-diethylcyclohexane;
1,2-diamino-3-methylcyclooctane;
1,2-diaminocyclodecane;
1,2-diaminocyclopentane;
1,2-diaminocycloheptane;
1,2-diamino-5-methylcycloheptane;
1,2-diamino-4,4,5,6-tetramethylcyclohexane; and
1,2-diamino-3,3-dimethyl-4,4-diethylcycloheptane Examples of the 1,2-cycloalkadiones capable of being utilized herein as follows:

3-methyl-1,2-cyclohexadione;
1,2-cycloheptadione;
1,2-cyclohexadione;
3-methyl-1,2-cyclohexadione;
1,2-cyclopentadione;
1,2-cyclodecadione;
3-methyl-1,2-cyclopentadione;
4,5-dimethyl-1,2-cyclopentadione;
3-ethyl-1,2-cyclopentadione;
3-ethyl-1,2-cyclohexadione;
3-propyl-1,2-cyclohexadione;
3-ethyl-4-propyl-1,2-cyclohexadione;
4-methyl-1,2-cyclooctadione;
4-methyl-1,2-cyclodecadione;
4-methyl-1,2-cyclononadione; and
5-propyl-1,2-cyclodecadione It will be understood that the enolic form of the alkadione can also be utilized and that the alkadione will be taken to include the enol form.

In reactions involving dioxoalkanes, the temperature of the reaction is desirably below 50° C. to prevent decomposition of the dehydropiperazine to unwanted by-products. Temperatures below —80° C. are not necessary and can require excessive time for completion of the reaction. It is accordingly desirable to use temperatures from about —80° C. to 50° C., and it is preferred to utilize temperatures of from about —30° C. to 25° C. For reactions involving 1,2-cycloalkadiones, vehicle reflux temperatures are utilized, preferably from 50° to 150° C.

The reaction is desirably carried out in an inert reaction vehicle to reduce polymer formation, to permit better control over the reaction temperature, and to improve mixing of the reactants. The preferred inert reaction vehicles are solvents and include alkanols, preferably lower alkanols such as methanol, and aryl hydrocarbons such as benzene, toluene, xylene, and the like. The crude bicyclic dehydropiperazine is then striped of vehicle and further purified as desired according to the procedures hereinafter described.

The ratio of diaminocycloalkane to the glyoxal, or of cycloalkadione to diaminoalkane, can be stoichiometric, but better yields are frequently obtained with amounts of dioxoalkane, such as glyoxal or diaminoalkane in excess of stoichiometric. It is accordingly desirable to utilize quantities of the dioxoalkane or diaminoalkane up to a three-fold excess of stoichiometric. It will be appreciated by those skilled in the art that use of 1,2-diamino-3-ethylcyclohexane with glyoxal yields 5-ethyl-4a,5,6,7,8,8a-hexahydroquinoxaline and reaction of 1,2-diaminocyclohexane with diacetyl will provide 2,3-dimethyl-4a,5,6,7,8,8a-hexahydroquinoxaline, and so on.

It will be understood according to the present invention that the products prepared herein can be neutralized and purified to yield the desired substances. The novel bicyclic dehydropiperazines can be obtained in purer form or in substantially pure form by conventional purification techniques. Thus, the products can be purified and/or isolated by distillation, sublimation, extraction, crystallization, preparative chromatographic techniques, and the like.

The bicyclic dehydropiperazines and mixtures thereof according to the present invention can be used to alter, vary, fortify, modify, enhance, or otherwise improve the flavor of a wide variety of materials which are ingested, consumed, or otherwise organoleptically sensed.

The term "alter" in its various forms herein means the supplying or imparting of a flavor character or note to an otherwise bland, relatively tasteless substance, or augmenting an existing flavor characterictic where the natural flavor is deficient in some regard, or supplementing the existing flavor impression to modify organoleptic character.

Such dehydropiperazines are accordingly useful in flavoring compositions. A flavoring compostion is taken to mean one which contributes a part of the overall flavor impression by supplementing or fortifying a natural or artificial flavor in a material or one which supplies substantially all the flavor and/or aroma character to a consumable article.

The term "foodstuff" as used herein includes both solid and liquid ingestible materials for man or animals, which materials usually do, but need not, have nutritional value. Thus, foodstuffs include meats, gravies, soups, convenience foods, malt, alcoholic, and other beverages, milk and dairy products, seafoods including fish, crustaceans, mollusks, and the like, candies, vegetables, cereals, soft drinks, snacks, dog and cat foods, other veterinary products, and the like.

The term "tobacco" will be understood herein to mean natural products such as, for example, burley, Turkish tobacco, Maryland tobacco, flue-cured tobacco and the like including tobacco-like or tobacco-based products such as reconstituted or homogenized leaf and the like, as well as tobacco substitutes intended to replace natural tobacco, such as lettuce and cabbage leaves and the like. The tobaccos and tobacco products include those designed or used for smoking such as in cigarette, cigar, and pipe tobacco, as well as products such as snuff, chewing tobacco, and the like.

When the bicyclic dehydropiperazines of this invention are used in a flavoring composition, they can be combined with conventional flavoring materials or adjuvants. Such co-ingredients or flavoring adjuvants are well known in the art for such use and have been extensively described in the literature. Apart from the requirement that any such adjuvant material be ingestibly acceptable, and thus non-toxic or otherwise non-deleterious, conventional materials can be used and broadly include other flavor materials, vehicles, stabilizers, thickeners, surface active agents, conditioners. and flavor intensifiers.

Such conventional flavoring materials include saturated, unsaturated, and amino acids; alcohols, including primary and secondary alcohols; esters; carbonyl compounds including ketones and aldehydes; lactones; other cyclic organic materials including benzene derivatives, alicyclics, heterocyclics such as furans, pyridines, pyrazines and the like; sulfur-containing materials including thiols, sulfides, disulfides and the like; proteins; lipids; carbohydrates; so-called flavor potentiators such as monosodium glutamate, guanylates, and inosinates; natural flavoring materials such as cocoa, vanilla, and caramel; essential oils and extracts such as anise oil; clove oil, and the like; artificial flavoring materials such as vanillin; and the like.

Stabilizers include preservatives such as sodium chloride, and the like, antioxidants such as calcium and sodium ascorbate, ascorbic acid, butylated hydroxyanisole, butylated hydroxytoluene, propyl gallate and the like, sequestrants such as citric acid, EDTA, phosphates, and the like.

Thickeners include carriers, binders, protective colloids, suspending agents, emulsifiers and the like, such as agar-agar, carrageenan, cellulose and cellulose derivatives such as carboxymethyl cellulose and methyl cellulose, natural and synthetic gums such as gum arabic, gum tragacanth, and the like, and other proteinaceous materials, lipids, carbohydrates, starches, and pectins.

Surface active agents include emulsifying agents such as mono- and/or diglycerides of fatty acids such as capric acid, caprylic acid, palmitic acid, myristic acid, stearic acid, oleic acid, and the like, lecithin, defoaming and flavor-dispersing agents such as sorbitan monostearate, potassium stearate, hydrogenated tallow alcohol, and the like.

Conditioners include compounds such as bleaching and maturing agents such as benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents such as sodium acetate, ammonium bicarbonate, ammonium phosphate, citric acid, lactic acid, vinegar and the like; colorants such as carminic acid, cochineal, turmeric, curcumin and the like; firming agents such as aluminum sodium sulfate, calcium chloride and calcium gluconate; texturizers; anti-caking agents such as aluminum calcium sulfate and tribasic calcium phosphate; enzymes; yeast foods such as calcium lactate and calcium sulfate; nutrient supplements such as iron salts such as ferric phosphate, ferric pyrophosphate, ferrous gluconate and the like, riboflavin, vitamins, zinc sources such as zinc chloride, zinc sulfate, and the like.

The bicyclic dehydropiperazines, or the compositions incorporating them, as mentioned above, can be combined with one or more vehicles or carriers for adding them to the particular product. Vehicles can be edible or otherwise suitable materials such as ethyl alcohol, propylene glycol, water, and the like. Carriers include materials such as gum arabic, carrageenan, other gums, and the like. The dehydropiperazines can be incorporated with the carriers by conventional means such as spray-drying, drum-drying, and the like. Such carriers can also include materials for coacervating the dehydropiperazines (and other flavoring ingredients, as present) to provide encapsulated products. When the carrier is an emulsion, the flavoring composition can also contain emulsifiers such as mono- and diglycerides of fatty acids and the like. With these carriers or vehicles the desired physical form of the composition can be prepared.

It will be understood by those skilled in the art that the bicyclic dehydropiperazines can be added to the production of the finished product. Thus, when the dehydropiperazines are used to alter or otherwise vary the flavor of a foodstuff, they can be added in the original mixture, dough, emulsion, batter, or the like prior to any cooking or heating operation. Alternatively, they can be added at a later stage of processing if volatilization losses would be excessive during the earlier processing.

When the materials are used to treat tobacco products, for example, the additive can be applied in a suitable manner, as by spraying, dipping, or otherwise. The bicyclic dehydropiperazines can be applied during the "casing" or final spray treatment of the tobacco, or they can be applied at some earlier stage of curing or preparation. The quantity of dehydropiperazines or mixtures thereof utilized should be sufficient to impart the desired flavor characteristic to the product, but on the other hand, the use of an excessive amount of the dehydropiperazines is not only wasteful and uneconomical but in some instances too large a quantity may unbalance the flavor or other organoleptic property of the product consumed. The quantity used will vary depending upon the ultimate foodstuff, tobacco product, or other consumable product; the amount and type of flavor initially present in the product; the further process or treatment steps to which the product will be subjected; regional and other preference factors; the type of storage, if any, to which the product will be subjected; and the preconsumption treatment, such as baking, frying, and so on, given to the product by the ultimate consumer. Accordingly, the terminology "effective amount" and "sufficient amount" is understood in the context of the present invention to be quantitatively adequate to alter the flavor of the foodstuff, tobacco, or other consumable material.

It is accordingly preferred that the ultimate compositions contain from about 0.1 part per million (p.p.m.) to about 100 p.p.m. of bicyclic dehydropiperazine. More particularly, in food compositions it is desirable to use from about 0.1 to about 50 p.p.m. and in certain preferred embodiments of the invention, from about 1 to about 15 p.p.m. of the dehydropiperazines are included in the finished product. On the other hand, tobacco compositions can contain as little as 0.1 p.p.m. and as much as 100 p.p.m., depending upon whether a cigarette tobacco, a pipe tobacco, a cigar tobacco, a chewing tobacco, or snuff is being prepared. All parts, proportions, percentages, and ratios herein are by weight unless otherwise indicated.

The amount of bicyclic dehydropiperazine or dehydropiperazines to be utilized in flavoring or flavor-enhancing composition can be varied over a wide range depending upon a particular quality to be added to the foodstuff, tobacco, or other consumable material. Thus, amounts of one or more bicyclic dehydropiperazines according to the present invention from about 0.1 percent up to 80 or 90 percent can be incorporated in such compositions. It is generally found to be desirable to include from about 0.5 to about 25% of the bicyclic dehydropiperazines in such compositions.

The bicyclic dehydropiperazines of this invention are also useful individually or in admixtures as fragrances. They can be used to contribute a nut-like or honey fragrance. As olfactory agents the dehydropiperazines of this invention can be formulated into or used as components of a "perfume composition."

The term "perfume composition" is used herein to mean a mixture of organic compounds, including, for example, alcohols, aldehydes, ketones, nitriles, esters, and frequently hydrocarbons which are admixed so that the combined odors of the individual components produce a pleasant or desired fragrance. Such perfume compositions usually contain: (a) the main note or the "bouquet" or foundation-stone of the composition; (b) modifiers which round-off and accompany the main note; (c) fixatives which include odorous substances which lend a particular note to the perfume throughout all stages of evaporation, and substances which retard evaporation; and (d) top-notes which are usually low-boiling fresh smelling materials.

In perfume compositions the individual component will contribute its particular olfactory characteristics, but the overall effect of the perfume composition will be the sum of the effect of each ingredient. Thus, the individual compounds of this invention, or mixtures thereof, can be used to alter the aroma characteristics of a perfume composition, for example, by high-lighting or moderating the olfactory reaction contributed by another ingredient in the composition.

The amount of the compounds of this invention which will be effective in perfume compositions depends on many factors, including the other ingredients, their amounts and the effects which are desired. It has been found that perfume compositions containing as little as 2% of the compounds of this invention, or even less, can be used to impart a scent to soaps, cosmetics, and the other products. The amount employed can range up to 50% or higher and will depend on considerations of cost, nature of the end product, the effect desired on the finished product and the particular fragrance sought.

The bicyclic dehydropiperazines of this invention can be used alone or in a perfume composition as an olfactory component in detergents and soaps; space odorants and deodorants; perfumes; colognes; toilet waters; bath preparations such as bath oil and bath salts; hair preparations such as lacquers, brilliantines, pomades, and shampoos; cosmetic preparations such as creams, deodorants, hand lotions, and sun screens; powders such as talcs, dusting powders, face powder, and the like. When used as an olfactory component of a perfumed article, as little as 0.01% of one or more of the bicyclic dehydropiperazines will suffice to impart a nut-like or honey odor. Generally, no more than 0.3% is required.

In addition, the perfume composition or fragrance composition can contain a vehicle or carrier for the dehydropiperazines alone or with other ingredients. The vehicle can be a liquid such as alcohol, glycol, or the like. The carrier can be an absorbent solid such as a gum or components for encapsulating the composition.

The following examples are given to illustrate embodiments of the invention as it is presently preferred to practice it. It will be understood that these examples are illustrative, and the invention is not to be considered as restricted thereto except as indicated in the appended claims.

EXAMPLE I

Preparation of 4a,5,6,7,8,8a-hexahydroquinoxaline

A five-liter Morton flask equipped with an agitator, thermometer, reflux condenser, addition funnel, and gas sparging tube is charged with a solution of 114.2 g. (1.0 mole) of 1,2-diaminocyclohexane in 2700 ml. of 95% ethanol. The flask contents are cooled to −20° C., and 159.8 g. (1.1 mole) of 40% aqueous glyoxal is added during ten minutes. About 2–3 minutes after the addition is complete, the reaction mixture assumes a milky, heterogenous appearance. The mixture is then stirred for two hours at −20° C.

The resulting mixture is found to have an intense popcorn aroma. The mixture is found by mass spectroscopy to contain the 4a,5,6,7,8,8a-hexahydroquinoxaline.

EXAMPLE II

Preparation of 5-methyl-3,4,6,7-tetrahydro-2(H)-cyclopentapyrazine

A reaction mixture is prepared by dissolving 12.4 g. 3-methyl-2-hydroxy-2-cyclopenten-1-one (the enol form of 3-methyl-1,2-cyclopentadione) in 10 g. of ethylene diamine. The mixture is then stirred at room temperature (23° C.) and an exothermic reaction takes place. The mixture thickens and after two hours forms a solid crystalline mass.

The solid mass is dissolved in 50 ml. of methylene chloride and washed with 10 ml. of water. The water layer is back-washed with an equal volume of methylene chloride, and the combined methylene chloride solutions are evaporated to dryness to yield 15.2 g. of a crystalline mass having a bready, nut-like aroma. The product is purified by sublimation.

The product obtained is 5-methyl-3,4,6,7-tetrahydro-2(H)-cyclopentapyrazine. Infrared (IR) analysis indicates an NH band, and mass spectroscopy shows a molecular weight of 136. The material has a good nut-like aroma suggestive of tobacco and burns well with natural tobacco. The odor is also similar to that of fresh baked goods in a one percent solution in 95% ethanol. The taste in water at 5 p.p.m. is near the threshold level with a pleasant, sweet, light roasted, buttery note. A 20 p.p.m. aqueous solution has a melted butter flavor character; a 50 p.p.m. solution, a bread-crust character. A 50 p.p.m. solution in sugar water has a flavor like fresh sugar cookies or fresh corn flakes. In salt water at 50 p.p.m. it has a taste reminiscent of fresh baked pretzels, with a bread-crust flavor note.

EXAMPLE III

Preparation of 2,3-dimethyl-4a,5,6,7,8,8a-hexahydroquinoxaline

A Morton flask equipped with agitator, thermometer, condenser, addition funnel, gas dispersion tube, and cooling means is charged with 11.40 g. of 1,2-diaminocyclohexane in 200 cc. of 95% ethanol. During a 20-minute period a solution of 816 g. of 2,3-butanedione is added dropwise. The temperature rises from 25° to 37° C. and the flask contents turn milky-white upon such addition. The reaction mixture turns clear after 15 minutes.

The ethanol is removed by evaporation under reduced pressure and the residue is distilled under vacuum yielding 16.1 g. of product boiling at 72–76° C. at 1.4–1.7 mm. Hg. Gas chromatographic (GC) analysis shows a mixture of the cis and trans isomers, and the material has a broad melting range of 60° to 110° C. Initially a white solid, the product discolors on storage.

The material has a cedar wood, tobacco, buttery odor. In chocolate beverages it imparts a bitter character without the addition of any foreign flavor note. In a soap bouquet perfume composition, the compound can be used to replace natural cedarwood.

Other 2,3-dialkylhexahydroquinoxalines or 2-alkylhexahydroquinoxalines can be similarly prepared by utilizing other 1,2-dialkyl glyoxals or 1-alkylglyoxals instead of 2,3-butanedione.

EXAMPLE IV

Preparation of 5,7,7-trimethyl-2,3,4,6,7,8-hexahydroquinoxaline

A mixture of 6 g. (0.1 mol) of ethylenediamine and 15.4 g. (0.1 mol) of 2-hydroxy-3,5,5-trimethyl-2-cyclohexen-1-one (the enol form of 3,5,5-trimethyl-1,2-cyclohexandione) is refluxed for five hours in one liter of benzene in a three-liter flask fitted with a Bidwell-Sterling distillation receiver. During the refluxing, 3.5 ml. of water is collected. After refluxing is completed, the solvent is stripped off.

The resulting trimethyl substituted reduced bicyclic pyrazine has a tobacco, nougat aroma in a 0.2 percent solution in 95% ethanol. In aqueous solution at 0.4 p.p.m. it has a fruity taste with tobacco leaf and cedarwood notes. It is suitable for honey, nougat, and tobacco flavors.

EXAMPLE V

Preparation of 2,3,5,6,7,8,9,10,11,12-decahydrocyclodecapyrazine

A mixture of 3.8 g. of 1,2-cyclodecadione, 2.0 g. of ethylene diamine, and 200 ml. of benzene is refluxed in a 250 ml. round bottom flask equipped with a Bidwell trap and condenser. During a 2.5-hour period one milliliter of water is collected.

After the reaction, the flask contents are cooled and the benzene is stripped off. PMR and mass spectral analyses confirm the production of the decahydrocyclodecapyrazine. The material so produced has nut-like and fatty flavor.

EXAMPLE VI

Preparation of 5-methyl-2,3,6,7-tetrahydrocyclopentapyrazine

A five-liter flask equipped with a stirrer, a Bidwell trap, and a condenser is charged with three liters of benzene, 116 g. of 3-methyl-2-hydroxy-2-cyclopenten-1-one, and 72 g. of 91–93% ethylene diamine. In 2.5 hours, 46 ml. of water is collected.

The flask contents are cooled, the benzene is stripped off in a Büchi apparatus, and the solid residue is held under vacuum overnight to remove all traces of benzene.

A thirty gram portion of the product is sublimed to provide about 12 g. of purified product.

EXAMPLE VII

A cheddar cheese flavoring formulation is prepared by admixing the following ingredients in the amounts indicated:

| Ingredient: | Amount (parts) |
|---|---|
| Methyl hexyl ketone | 2 |
| Diacetyl | 10 |
| Isovaleric acid | 50 |
| Hexanoic acid | 200 |
| Butyric acid | 250 |
| Caprylic acid | 600 |
| Compound prepared in Example II | 5 |

The foregoing cheese formula is incorporated into a bland cream cheese and, when tested on crackers, is found to have an excellent, sharp cheddar cheese flavor.

EXAMPLE VIII

Beef soup

The following beef soup-flavoring composition is prepared:

| Ingredient: | Amount (parts) |
|---|---|
| Salt | 33.00 |
| Hydrolyzed vegetable protein | 23.94 |
| Monosodium glutamate | 14.63 |
| Sucrose | 13.33 |
| Autolyzed yeast powder | 4.00 |
| Onion powder | 6.00 |
| Beef extract flavor (Example XVI of U.S. Pat. 3,394,016) | 3.30 |
| Caramel color powder | 2.00 |
| Celery seed powder | 0.27 |
| White pepper powder | 0.13 |

Five ounces of the foregoing mix is added to 8 ounces of boiling water to produce a soup with a beef flavor. This preparation is repeated with a second five-ounce portion in 8 ounces of boiling water to which is added 10 p.p.m. of the product of Example II. The second preparation containing the pyrazine is judged to have improved flavor and aroma with more beef flavor character.

EXAMPLE IX

A beef-flavored gravy is prepared by combining the following materials:

| Ingredient: | Amount (parts) |
|---|---|
| Water | 350 |
| Non-fat milk solids | 20 |
| All-purpose flour | 16 |
| Lard | 13 |
| Pregelatinized starch | 8 |
| Margarine | 5 |
| Bacon fat | 5 |
| Salt | 3 |
| Monosodium glutamate | 3 |
| Sucrose | 2 |
| Hydrolyzed vegetable protein | 1 |
| Beef extract flavor (per Example VIII of U.S. Pat. 3,394,016) | 1.6 |
| Caramel color powder | 0.05 |

The foregoing ingredients are homogenized and then autoclaved. A beef gravy is obtained. When 10 p.p.m. of the pyrazine of Example II is added, a more pronounced beef flavor character is obtained.

EXAMPLE X

A confection center is prepared from the following ingredients:

| Ingredient: | Amount (parts) |
|---|---|
| Peanut butter | 300 |
| Ground sweet cracker meal | 100 |
| Confectioners sugar | 200 |
| Shortening | 25 |

When 5 p.p.m. of the product of Example II is added to the confectionery center composition, a fuller, richer flavor character is obtained.

EXAMPLE XI

Bacon-flavor powder

A material useful for providing a bacon flavor to foodstuffs is prepared by admixing the following ingredients:

| Ingredient: | Amount (parts) |
|---|---|
| Salt | 45 |
| Hickory smoke flavor | 5 |
| Furfural | 0.1 |
| Guaiacol | 0.1 |
| Isoeugenol | 0.1 |
| Ethanol | 0.1 |
| Pelargonic acid | 0.1 |
| Oleic acid | 1.0 |
| Gum arabic | 8 |
| Water | 20 |

After the foregoing mixture is prepared 10 p.p.m. of the pyrazine of Example IV is added, and the mixture is spray-dried in a Bowen spray-drier. This bicyclic dehydropiperazine imparts a nut-like flavor note to the bacon flavor.

EXAMPLE XII

Perfume composition

A "bouquet" type of perfume composition is prepared by admixing the following ingredients:

| Ingredient: | Amount (parts) |
|---|---|
| Terpineol | 200 |
| Rosewood | 200 |
| Lavender Spike | 100 |
| Diphenyl oxide | 30 |
| Material produced in Example IV | 100 |
| Citronella, Java | 200 |
| Clove | 50 |
| Linalyl acetate | 50 |
| Red thyme | 20 |
| Styrax | 20 |
| Musk xylene | 30 |

The material of Example IV is used in the foregoing perfume composition in lieu of an equal amount of natural cedarwood, and the composition is found to have substantially the same odor quality as would be obtained with natural cedarwood.

What is claimed is:

1. Bicyclic dehydropiperazines having the formula:

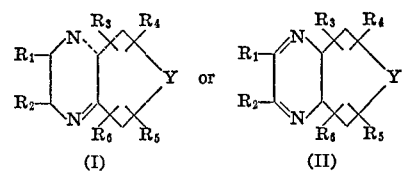

(I)    or    (II)

wherein Y is (—$CH_2$—)$_n$; $n$ is an integer from one to six; one of the dashed lines is a double bond and the other dashed line is a single bond; and $R_1$, $R_2$, $R_3$, $R_4$, $R_5$, and $R_6$ are the same or different and represent hydrogen or lower alkyl having one to three carbon atoms.

2. A bicyclic dehydropiperazine according to Formula I of claim 1 where $n$ is one; $R_1$, $R_2$, $R_4$, $R_5$, and $R_6$ are hydrogen; and $R_3$ is methyl substituent on the carbon atom between Y and the dashed line.

3. A bicyclic dehydropiperazine according to claim 1 where $n$ is two; $R_1$ and $R_2$ are methyl; and $R_3$, $R_4$, $R_5$, and $R_6$ are hydrogen.

4. A bicyclic dehydropiperazine according to claim 1 wherein $n$ is two; $R_5$ and $R_6$ are methyl groups substituent on the ring carbon atom immediately below Y; $R_3$ is a methyl group substituent on the other carbon atom adjacent to Y; and $R_1$, $R_2$, $R_4$ are hydrogen.

5. A bicyclic dehydropiperazine according to claim 1 wherein $n$ is six and $R_1$, $R_2$, $R_3$, $R_4$, $R_5$, and $R_6$ are hydrogen.

References Cited

UNITED STATES PATENTS 3,471,492  10/1969  Johnston _____ 260—250 R

FOREIGN PATENTS

6812899     Netherlands _____ 260—250

NICHOLAS S. RIZZO, Primary Examiner

U.S. Cl. X.R.

99—24, 124, 134, 140; 131—17; 252—522